United States Patent
Leihs et al.

(10) Patent No.: US 9,361,535 B2
(45) Date of Patent: Jun. 7, 2016

(54) METHOD FOR READING VEHICLE IDENTIFICATIONS

(71) Applicant: Kapsch TrafficCom AG, Vienna (AT)

(72) Inventors: Dietrich Leihs, Vienna (AT); Alexander Abl, Viktring (AT); Oliver Nagy, Vienna (AT)

(73) Assignee: Kapsch TrafficCom, Vienna (AT)

( * ) Notice: Subject to any disclaimer, the term of this patent is extended or adjusted under 35 U.S.C. 154(b) by 139 days.

(21) Appl. No.: 14/205,892

(22) Filed: Mar. 12, 2014

(65) Prior Publication Data

US 2014/0270386 A1 Sep. 18, 2014

(30) Foreign Application Priority Data

Mar. 13, 2013 (EP) .................................... 13158878

(51) Int. Cl.
*G06K 9/32* (2006.01)
*G08G 1/017* (2006.01)

(52) U.S. Cl.
CPC .............. *G06K 9/325* (2013.01); *G06K 9/3258* (2013.01); *G08G 1/0175* (2013.01); *G06K 2209/15* (2013.01)

(58) Field of Classification Search
None
See application file for complete search history.

(56) References Cited

U.S. PATENT DOCUMENTS

| | | | | |
|---|---|---|---|---|
| 7,970,644 B2 * | 6/2011 | Hedley | ................. | G07B 15/063 705/13 |
| 2001/0025251 A1 * | 9/2001 | Konishi | ............... | G07B 15/063 705/13 |
| 2006/0064345 A1 * | 3/2006 | Biet | ..................... | G07B 15/063 705/13 |
| 2012/0155712 A1 * | 6/2012 | Paul | ........................ | G06K 9/00 382/105 |
| 2013/0028481 A1 * | 1/2013 | Wu | ......................... | G06T 5/006 382/105 |
| 2013/0132166 A1 * | 5/2013 | Wu | ........................ | G07B 15/06 705/13 |

FOREIGN PATENT DOCUMENTS

EP 1085455 A2 3/2001

OTHER PUBLICATIONS

Extended European Search Report Received for EP Patent Application No. 13158878.2, mailed on Aug. 20, 2013, 4 pages.(Official Copy).

* cited by examiner

*Primary Examiner* — Bhavesh Mehta
*Assistant Examiner* — Menatoallah Youssef
(74) *Attorney, Agent, or Firm* — Fiala & Weaver P.L.L.C.

(57) ABSTRACT

A method is disclosed for reading license plate numbers in a road network, comprising: recording an image of a license plate number at a first location, OCR-reading a license plate character string in the image, and storing an OCR data set in a database; recording an image of a license plate number at a second location, OCR-reading a license plate number character string in the image, and generating a current OCR data set; and, if a confidence measure of the current OCR data set falls below a first minimum confidence value, selecting a stored OCR data set with a license plate number image having a similarity exceeding a minimum similarity value and/or having the greatest similarity to the license plate number image of the current OCR data set, and using the selected OCR data set for improving the license plate number character string of the current OCR data set.

16 Claims, 3 Drawing Sheets

METHOD FOR READING VEHICLE IDENTIFICATIONS

CROSS-REFERENCE TO RELATED APPLICATION(S)

This application claims priority to European Patent Application No. 13 158 878.2, filed on Mar. 13, 2013, the entirety of which is incorporated by reference herein.

BACKGROUND

1. Technical Field

The present subject matter relates to a method for reading license plate numbers by means of optical character recognition (OCR) in a road network.

2. Background Art

Methods for reading license plate numbers by means of OCR in a road network are used, e.g., for video-based road toll systems or parking fee systems in order to identify vehicles based on their license plate number (LPN), and thereby to levy fees for vehicles using a location, to track them, or to impose fines for using a location. In image recordings of the license plates of passing vehicles, the license plate numbers are localized and converted by an OCR reading process into a character string of individual characters.

However, due to changing lighting conditions and changing visibility, e.g., due to snow, rain, shadowing effects or glares, and also due to soiling or disadvantageous mounting of the license plate, the error rate of OCR methods in practical operation is very high, in most cases 10-15%. This problem becomes even more serious due to the fact that the installation locations of the OCR reading stations are often predetermined by legal or technical framework conditions, e.g., at border stations or places where power and data connections are available, and therefore cannot be selected with regard to advantageous visibility, which further complicates capturing proper images of license plate numbers and thus makes the OCR process more difficult.

BRIEF SUMMARY

It is an object of the disclosed subject matter to overcome these disadvantages and to create an improved method for OCR reading license plate numbers.

This object is achieved with a method of the aforementioned kind, comprising:

in a first OCR reading process, recording a first image of a license plate number at a first location in the road network, OCR-reading a first license plate character string in the first image recording, and storing a first OCR data set including the first license plate number image recording, the first license plate number character string and at least one first confidence measure of the first OCR reading process, as a stored OCR data set in a database;

in a second OCR reading process, recording a second image of a license plate number at a second location in the road network, OCR-reading a second license plate number character string in the second image recording, and generating a second OCR data set including the second license plate number image recording, the second license plate number character string and at least one second confidence measure of the second OCR reading process, as a current OCR data set;

and, if at least one confidence measure of the current OCR data set falls below a first minimum confidence value, selecting at least one stored OCR data set from the database, the license plate number image recording of which selected stored OCR data set has a similarity that exceeds a minimum similarity value and/or has the greatest respective similarity to the license plate number image recording of the current OCR data set, and using the at least one selected OCR data set for improving the license plate number character string of the current OCR data set.

In this manner, one or more earlier OCR-reading results of a license plate number are utilized for supporting or improving the current OCR reading result. By combined consideration or evaluation, the error rate thus can be significantly reduced. The disclosed subject matter is based here on the finding that in a temporally and/or spatially limited region of the road network with a plurality of geographically distributed OCR reading stations, there is a significant probability of OCR-reading the same license plate number twice or multiple times. Through this, the error potential in an OCR process can be reduced in that the current license plate number reading result is improved by selecting from earlier license plate number reading results or by superimposing earlier license plate reading results. Thus, additional OCR reading processes can also be performed at particularly "advantageous" locations, e.g., where vehicles move slowly or at a large distance between them, where all vehicles of a region have to pass, e.g., at border stations where good visibility prevails, e.g., on well-illuminated road sections, or where weather has no influence, e.g., in tunnels or the like. With all these measures, error potentials and therefore error rates of OCR reading processes at "disadvantageous" locations, which are required, e.g., due to legal and/or technical specifications, can be supported and improved.

Accordingly, an example embodiment of the method is characterized in that based on a plurality of different first locations, a plurality of different OCR data sets are stored in the database. The more and better first OCR reading processes and therefore OCR data sets are generated at first locations, the better can be carried out the second OCR reading processes at the second locations.

A use of the method, as an example, is that the license plate number character string of the current OCR data set is used for tolling a location usage of the vehicle in the road network, for example, calculating and levying a road toll for a toll road or a highway section, a regional toll for entering or staying in a region, e.g., a city toll, a parking or sojourn fee for the time of use of a location, e.g., a parking lot, or a fine for unauthorized use of a location, e.g., driving in a restricted area or the like. Generally speaking, location usage can be tolled (charged) time-related or location-related, or both. The use of the method is possible in "open" as well as in "closed" toll road systems: In open toll road systems, a toll booth is arranged within a road section to be tolled, and in closed toll system, toll booths are arranged at the entrances and exits of a road section to be tolled.

In a first embodiment of the method, the mentioned improvement can take place by superposing the license plate number image recording(s) of the at least one selected OCR data set and the license plate number image recording of the current OCR data set, and by OCR-reading again the license plate number character string of the current OCR data set in the superposition. Thus, a plurality of "blurry" image recordings can be superposed so as to form a "sharper" image (the superposition) in which OCR-reading can be carried out with a lower error rate.

According to an alternative embodiment of the method, the mentioned improvement can take place by taking over the license plate number character string of the selected OCR data set into the current OCR data set if at least one confidence measure of the selected OCR data set exceeds a second minimum confidence value and/or is greater than the corresponding confidence measure of the current data set. In this way, a "better" OCR reading result from one of the stored earlier OCR data sets can replace a "worse" reading result in the current OCR data set if it is similar and if its confidence measures are sufficient and/or better.

According to another example variant of the method, an OCR data set is stored in the database only if its at least one confidence measure exceeds a third minimum confidence value. As a result, the database receives only data sets with "good" character reading results, which makes the subsequent selection steps and/or similarity comparison steps easier.

The mentioned confidence measure of the OCR reading process represents the quality or hit rate of the OCR conversion of the image recording into a character string and is a by-product of the OCR reading processes known in the art: It indicates the reliability (confidence) of the reading process, i.e., with which probability the "correct" characters in the image recording have been identified and recognized. For example, the confidence measure can indicate a degree of similarity and/or match of the graphic characters illustrated in the image recording to previously known letter and numeral forms. The OCR reading process can deliver an overall "global" confidence measure, or, in another example, a separate (character) confidence measure for each individual character of the generated character string. Any confidence measure, a plurality of confidence measures or all of these confidence measures can be included in the mentioned comparisons. Moreover, from the individual character confidence measures of all characters of the character string, the "global" confidence measure can also be averaged as another confidence measure, which can be used for the aforementioned comparisons.

Another embodiment of the method is characterized in that the stored OCR data set and/or each stored OCR data set and the current OCR data set also contain in each case the location of the license plate number image recording, and that during said selecting only those stored OCR data sets are considered, the locations of which lie in a predetermined region around the location of the current OCR data set. Alternatively or additionally, the stored OCR data set or each stored OCR data set and the current OCR data set can in each case also contain the time of their license plate number image recording, and during the mentioned selection, only those stored OCR data sets are considered, the times of which lie within a predetermined period around the time of the current OCR data set. Instead of such a "time stamp", it can also be provided that the OCR data sets in the database are stored in each case only for a predetermined period, which allows a particularly simple way of ignoring OCR data sets that are "too old". All these measures have the advantage that the selection among the stored OCR data sets becomes faster and more accurate, and the subsequent improvement of the current OCR data set is also simplified.

The first locations may, for example, comprise at least some or all intersections of the road network with a closed geographical region. The geographical region can in particular be a city or a country. In this way, the database, as it were, contains a "pool" of all license plate numbers which are read until now in the geographical region—optionally within a predetermined period, e.g., the current day—and which are used for improving the respective current OCR data set.

The method is suitable for both stationary and mobile OCR reading stations. For example, image recording at the first locations can be carried out from a control vehicle which travels in front of or behind the vehicle to be inspected and which, in particular at the same driving speed and a short distance between the vehicles, has excellent visibility of the license plate of the vehicle in front or behind, and therefore can generate a high-quality license plate number reading result with a high confidence measure in order to make this result available, e.g., to OCR reading stations located at disadvantageous second locations for improving their OCR data sets. Conversely, image recording at a second location can also be carried out from a moving control vehicle which, for example, has only a temporary and poor visibility of the license plate and can be supported by "good" OCR data sets of OCR reading stations located at "advantageous" stationary locations.

The method can be carried out by means of a central database and also by means of direct mutual accesses to the first and second OCR reading stations. According to an embodiment of the method, the database is kept in a control center of the road network, and the OCR data sets to be stored are transmitted from the first locations to the control center, and the current OCR data set is transmitted from the second location to the control center for said selecting; alternatively, the database can be kept locally at one of the first locations, and the current OCR data set is transmitted from the second location to the nearest first location for said selecting.

Further features and advantages, as well as the structure and operation of various embodiments, are described in detail below with reference to the accompanying drawings.

BRIEF DESCRIPTION OF THE DRAWINGS/FIGURES

The present subject matter is explained below in greater detail by means of exemplary embodiments illustrated in the accompanying drawings. In the figures.

Embodiments will now be described with reference to the accompanying drawings.

DETAILED DESCRIPTION

Figure 1:
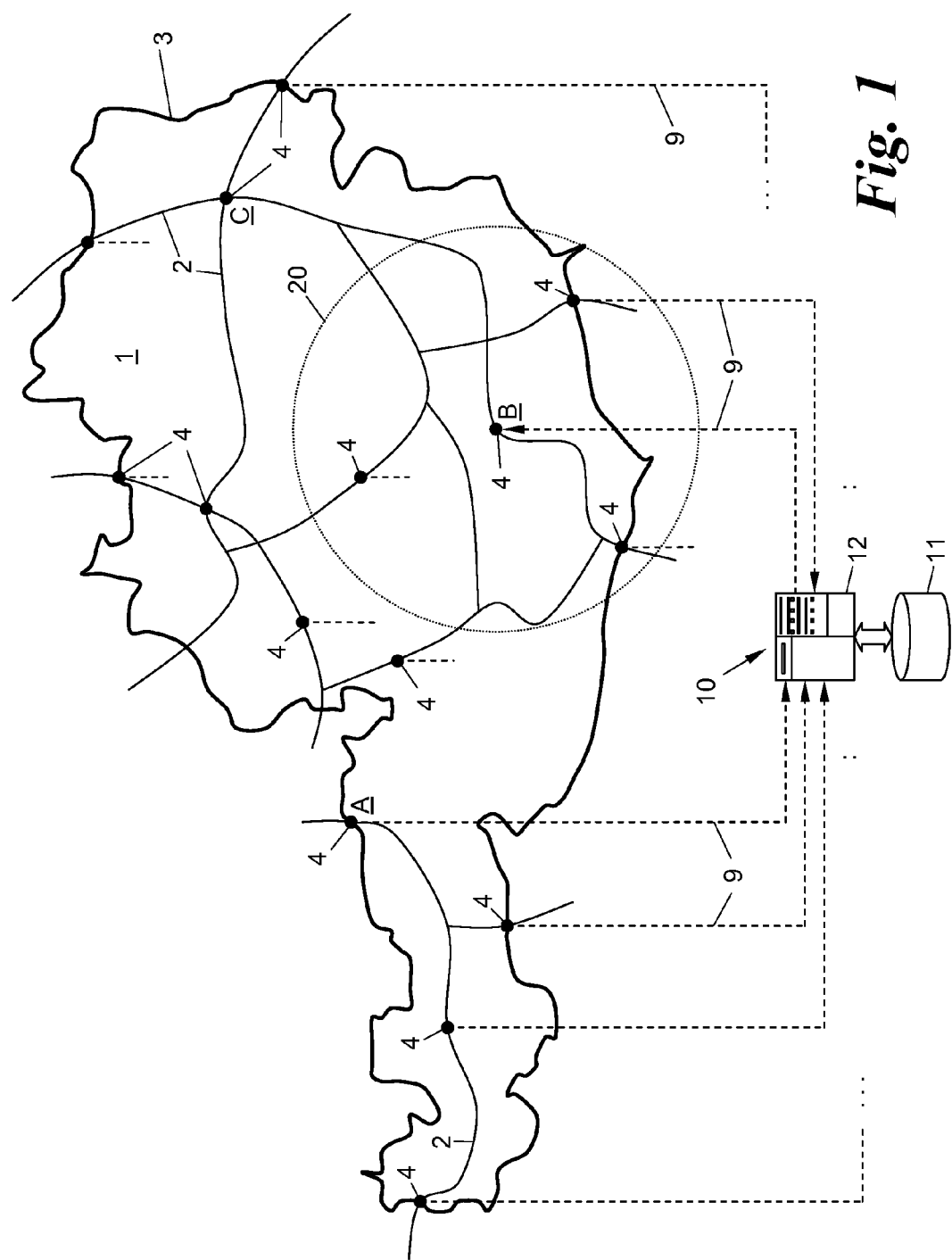
FIG. 1 shows a road network with OCR reading stations and a central database for carrying out the method.

FIG. 1 shows a road network 1 comprising a multiplicity of different interconnected road sections 2, namely partially that portion of the road network 1 that falls into a geographic region 3. The geographical region 3 can be, for example, a country (here Austria), but also a county, a highway including a plurality of road sections, an inner city etc.

Figure 2:
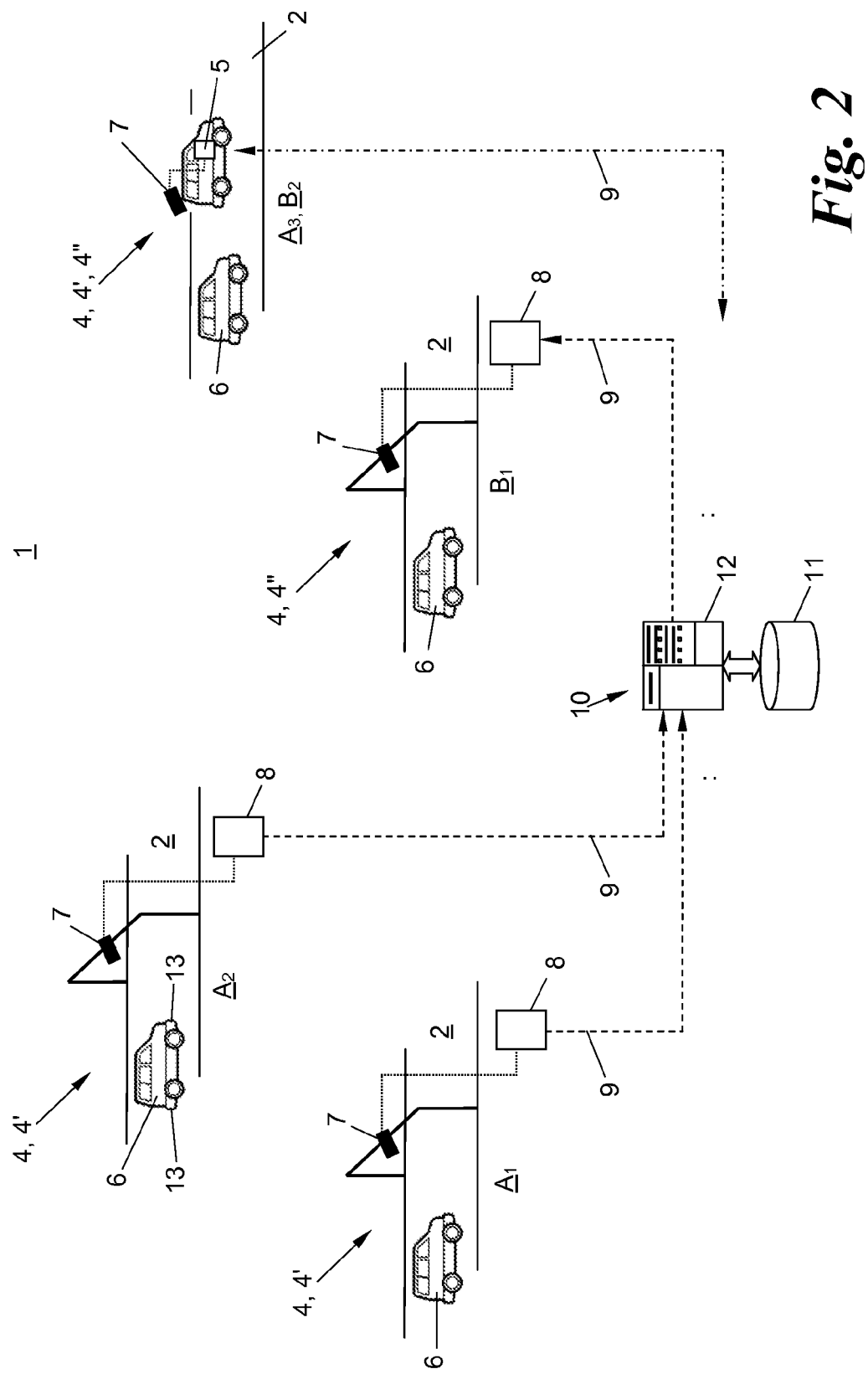
FIG. 2 shows a detailed block diagram of some of the OCR reading stations of FIG. 1 in connection with the central database.

Within the road network 1, numerous OCR reading stations 4 are distributed, some of which are shown in detail in FIG. 2 and are differentiated there by 4' and 4" according to their respective role as "first" or "second" OCR reading stations within the context of the method. It is understood that each of the OCR reading stations 4 shown in FIG. 1 can function in each case as first OCR reading stations 4' and also as second OCR reading stations 4". Moreover, each of the OCR reading stations 4 can be both stationary and mobile, as illustrated by the OCR reading station 4 that is illustrated to the farthest right in FIG. 2 and which is carried by a control vehicle 5.

The OCR reading stations 2 may—but not necessarily—be distributed such that some or all intersections of the road network 1 with the outline (the border line) of the geographical region 3 have an OCR reading station 4, see, e.g., the exemplary "border" OCR reading station 4 at the location A, in order to be able to detect as completely as possible all vehicles 6 traveling in and out of the region 3. Numerous further OCR reading stations 4 can be located within the geographical region 3, namely on or in a road section 2, as shown at location B, and also at intersections of two road sections 2, as illustrated at C.

According to FIG. 2, each OCR reading station 4 (or 4', 4") has a photo or film camera 7 and a computing unit 8 connected thereto, which are in contact to a control center 10 of the road network 1 via wired or wireless data connections 9. The control center 10 contains a database 11, the purpose of which will be explained in greater detail later, and a corresponding computing unit 12 for keeping the database 11. The data connections 9 can be or also comprise an intranet or extranet, the Internet, terrestrial or satellite-based mobile networks, or the like.

Figure 3:
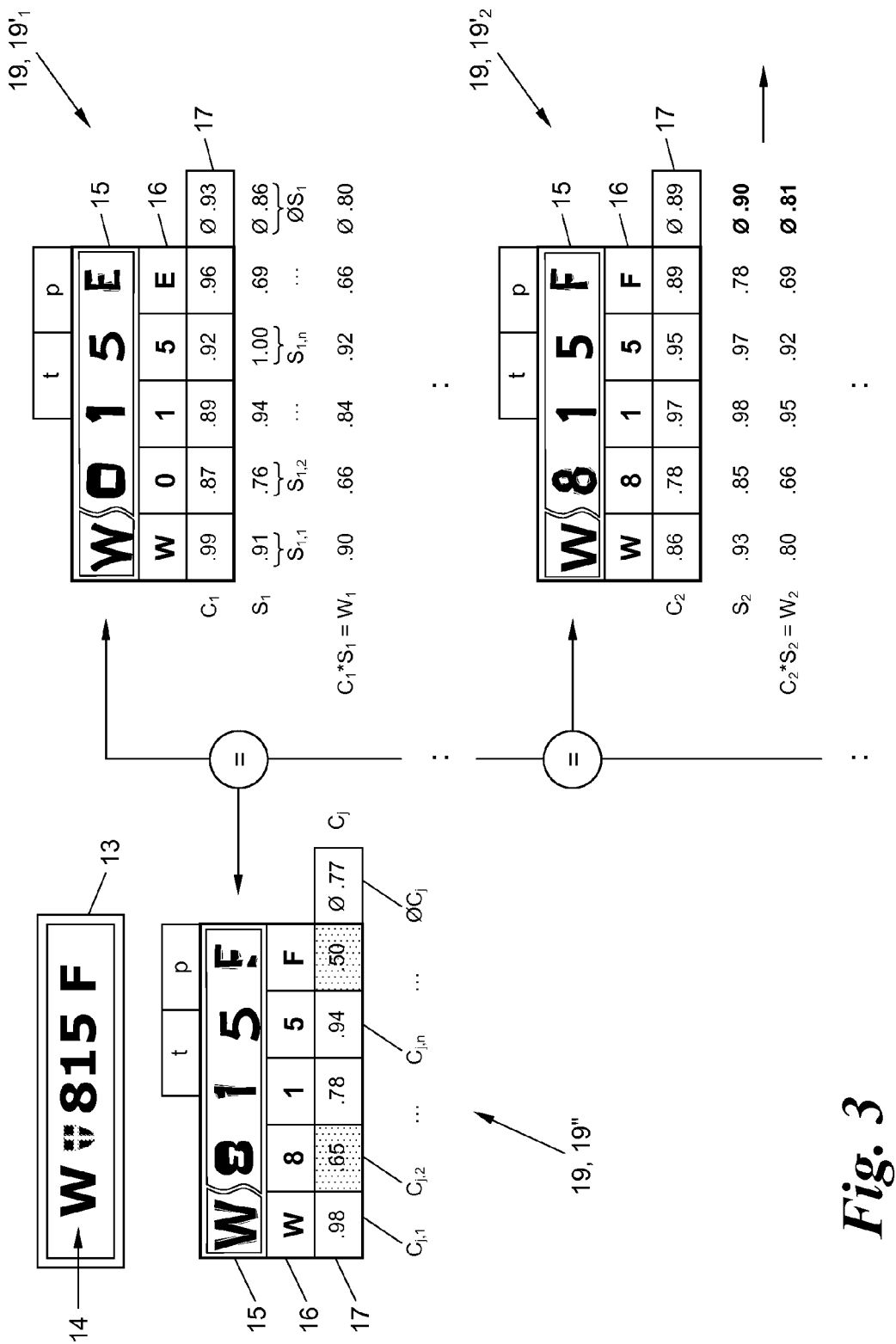
FIG. 3 shows exemplary license plate numbers and OCR data sets, and the evaluation thereof in different phases of the method.

The OCR reading stations 4 each record an image ("image recording") 15 of the license plate number (LPN) 14 placed on a license plate 13 of a vehicle 6. FIG. 3 shows an exemplary license plate 13 with the license plate number 14 "W815F". The information content of the "license plate number" 14 of the license plate 13 therefore is a "character string" 16 that can be processed by a machine in a simple manner and consists of the individual characters "W", "8", "1", "5", "F" without unnecessary image information like the city arms shown on the license plate 13 in the present example.

The task of the OCR reading station 4 is to determine by means of OCR (optical character recognition) the license plate number character string 16 "W815F" from an image recording 15 of the license plate 13 recorded by the camera 7. It is understood that the image recording 15 may also contain other parts of the vehicle or its surroundings, which is not relevant here.

The OCR reading process for converting the license plate number 15 into the license plate number character string 16 can take place in the local computing unit 8 of the OCR reading station 4, and it can also take place only later in the computing unit 12 of the control center 10; depending on this, the license plate number image recording 15 is transmitted only up to the computing unit 8 or further up to the control center 10. Also, the distribution shown in FIG. 2 of the components 7, 8, 11 and 12 among the units 4 and 10 is only of logical nature and not necessarily of physical nature, as illustrated. Thus, individual components of the components 8, 11 and 12 can be distributed among each the OCR reading stations 4 and/or among the OCR reading stations 4 and the control center 10, or can be combined in a different way.

Program-related details of the OCR reading process for converting a license plate number image recording 15 into a license plate number character string 16 are known in the art and do not need to be further explained; for example, image areas comprising potential characters are searched for in the image recording 15 and compared with known character forms, e.g., using two-dimensional correlation methods, in order to identify the individual characters of the license plate number character string 16 in the image recording 15.

All such similarity comparison methods, pattern recognition or correlation methods of OCR methods also deliver as a byproduct a so-called confidence measure, i.e., a quality measure for character recognition, which indicates the reliability (e.g. the degree of correlation or match with predetermined character forms) of the optical character recognition. FIG. 3 shows a vector 17 of individual confidence measures $C_{j,1}$, $C_{j,2}, \ldots$, in general $C_{j,n}$, which were obtained in the OCR reading process no. "j" for the character at the position "n" of the character string 16: the confidence measure $C_{j,1}$ of the optical character recognition of the character "W" at the first position (n=1) of the license plate number 14 of the j-th OCR reading was 98% (here also written as 0.98), the confidence measure $C_{j,2}$ of the second character "8" was 65%, etc. Optionally, from the confidence measures $C_{j,n}$ of all characters of the character string 16, another "global" confidence measure $ØC_j$ can be averaged, which, in the present example, was 77% for the OCR reading process j.

It is not necessary that an OCR reading process outputs a confidence measure $C_m$ for each individual character; an OCR method, e.g., could also immediately deliver only the global confidence measure $ØC_j$ for the entire conversion process of an image recording 15 into a character string 16.

The license plate number image recording 15, the license plate number character string 16 read therefrom by means of OCR, and at least one of the aforementioned confidence measures $C_{j,n}$, $ØC_j$, here the entire confidence measure vector 17 (with or without average value $ØC_j$), form an OCR data set 19 generated by the OCR reading station 4. If the OCR reading process is not carried out in the local computing unit 8, but in the central computing unit 12, the OCR data set 19 can also be compiled in the control center 10.

As can be seen in FIG. 3 and as explained at the beginning, the image recording 15 can be of poor quality, for example, due to poor lighting and visibility, weather conditions, soiling of the license plate 13 or the like, so that the correctness of the character string 16 is unreliable, which is reflected in correspondingly lower confidence measures $C_{j,n}$, $ØC_j$. For example, the confidence measures $C_{j,2}$ and $C_{j,5}$ of the second and fifth character "8" and "F", respectively, of the character string 16 in the OCR data set 19 are extremely low, here 65 and 50%, respectively, and the global confidence measure $ØC_j$ is only 77%. The error rate of the license plate number reading result, i.e., of the license plate number character string 16, is correspondingly high, and in order to reduce said error rate, the following method is carried out.

The method is based on the use of earlier license plate number reading results of the same license plate number 14 which were carried out with other OCR reading stations 4 and were stored as OCR data sets 19 in the database 11. For this purpose, all OCR reading stations 4 transmit the OCR data sets 19 generated by them to the control center 10, and the latter stores the OCR data sets 19 in the database 11. This is illustrated in greater detail by means of the exemplary scenarios of FIG. 2 and the data of FIG. 3.

In FIG. 2, on the left, two OCR reading stations 4' are shown, which, at two different first locations $A_1$ and $A_2$, prepare in each case image recordings 15 of license plate numbers 14 and/or license plates 13 of passing vehicles 6, and therefrom generate "first" OCR data sets 19'$_1$, 19'$_2$ in the aforementioned manner and feed them into the database 11. The first locations $A_1$, $A_2$ can in particular be situated at the borders of the regions 3; however, this is not mandatory; for example, a first location $A_3$ can also be the current location of a mobile control vehicle 5 which carries an OCR reading station 4, which then functions as one of the first OCR reading stations 4' and feeds an OCR data set 19' into the database 11, e.g., via a wireless connection 9.

At a later time and at another ("second") location $B_1$, another OCR reading station 4, here in the role of a second OCR reading station 4", reads again a license plate number 14 of a license plate 13 so as to generate further image recordings 15 and a further OCR data set 19". Said further data set 19" is also designated hereinafter as "current" OCR data set 19". If at least one of the confidence measures $C_{j,n}$, $ØC_j$ of the current OCR data set 19" does not reach or falls below a predetermined minimum confidence value $C_{min,1}$ of, e.g., 80% (here, the confidence measures $C_{j,2}$, $C_{j,5}$, $ØC_j$), the license plate number character string 16 of the current OCR data set 19" needs to be improved, and the steps described below are carried out.

If desired, the aforementioned check whether the minimum confidence value $Cmin_1$ has been reached could be eliminated, and the following steps could always be carried out, which, however, means increased computing time.

For the current OCR data set 19", those stored OCR data sets 19'$_1$, 19'$_2$, ..., in general 19'$_i$ are now picked out and selected which contain an image recording 15 that is similar to the image recording 15 of the current OCR data set 19". For this similarity comparison, an image pattern comparison or a two-dimensional correlation of the stored image recordings 15 with the current image recording 15 can be performed again, and a similarity measure (correlation measure) $S_1$, $S_2$, ..., in general $S_i$, can be determined.

In the example shown in FIG. 3, for each individual character that can be localized in the image recordings 15, a separate similarity measure $S_{i,n}$ between the image recording 15 of the current OCR data set 19" and the image recording 15 of the stored OCR data sets 19'$_1$, 19'$_2$ has been calculated, see similarity vector $S_1$ {91%, 76%, 94%, 100%, 69%} for the comparison with the OCR data set 19'$_1$, and the similarity vector $S_2$ {93%, 85%, 98%, 97%, 78%} for the comparison with the OCR data set 19'$_2$. Alternatively or additionally, (global) similarity measures $ØS_i$ can also be averaged from the individual character similarities $S_{i,n}$, see the averaged similarity $ØS_1$=86% of the first stored OCR data set 19'$_1$ to the current OCR data set 19", and the averaged similarity $ØS_2$=90% of the second stored OCR data set 19'$_2$ to the current OCR data set 19".

For determining the similarity measures $S_{i,n}$, $ØS_i$, it is optionally also possible to additionally consider the confidence measures $C_{i,n}$, $ØC_i$ of the individual stored OCR data sets 19'$_i$. Thus, for example, the individual character similarity measures $S_{i,n}$ can be weighted by the respective character confidence measures $C_{i,n}$, e.g., by multiplying so as to form a weighted similarity measure $W_{i,n}=C_{i,n}\cdot S_{i,n}$, and the latter can then be used as a similarity measure.

Based on the similarity measures $S_{i,n}$, $ØS_i$ (or $W_{i,n}$, $ØW_n$), those m (m=1, 2, ...) stored OCR data sets 19'$_i$ from the database 11 are determined which have the highest similarity measures $ØS_i$ (or $ØW_i$) (here, for m=1: the OCR data set 19'$_2$ with $ØS_2$=90%), or all those m stored OCR data sets 19'$_i$ are determined, the similarity measure $ØS_i$ (or $ØW_i$) of which exceeds a minimum similarity value $S_{min}$.

From the most similar m OCR data sets 19' determined in this manner, the image recording 15 contained therein are now retrieved and are used for improving the license plate number character string 16 of the current OCR data set 19". In a first variant of the method, the current image recording 15 and the image recordings 15 of the m selected OCR data sets 19'$_i$ are superposed for this purpose, e.g. pixel by pixel, so as to sharpen the image recording 15. It is understood that said superposing comprises any form of image processing method known in the art by means of which from two or more images of the same object, an improved single image of said object can be generated. In superposition, the character string 16 is then read again by means of OCR so as to generate an improved current OCR data set 19".

In an alternative embodiment of the method, the license plate number character string 16 of the current OCR data set 19" is directly replaced by the license plate number character string 16 of the most similar stored OCR data set 19'$_i$ if the confidence measures thereof are sufficient, i.e., if either all of the confidence measures $C_{i,n}$ thereof or at least the global confidence measure $ØC_i$ thereof exceed a second minimum confidence value $C_{min,2}$ and/or are greater than the respective confidence measure $C_{j,n}$, $ØC_j$ of the current OCR data set 19". Thus, in this variant, the license plate character string 16 of the "most similar" "better" OCR data set 19' is taken over in the current OCR data set 19".

The license plate number character string 16 of the OCR data set 19" improved in this manner can subsequently be used for controlling, tolling, fining or the like a location usage of the vehicle 6 at the second location B.

Each OCR data set 19 or 19', 19" can additionally contain the location p (i.e. $A_i$, $B_j$) and/or the time t of creating the image recording 15, as shown in FIG. 3. It is therefore possible during the similarity comparison of the OCR data set 19" with the stored OCR data sets 19'$_i$ to consider only those stored OCR data sets 19'$_i$ which lie within a locally predetermined region 20 around the current ("second") location $B_j$, and/or to consider only those stored OCR data sets 19'$_i$, the time t of which lies in a predetermined period $\Delta T$ around the current time t of the current OCR data set 19". Said period $\Delta T$ can be, for example, a day or some hours prior to the current time t of the current OCR data set 19", but also time around the current time t, i.e., before and after or only after said time t, so that even earlier OCR data sets 19" can be improved by means of later OCR data sets 19'$_i$ (which, of course, is possible only "offline" and not in real-time). Nevertheless, it is possible in this way to use any OCR data sets 19', 19" from the same region 20 and/or the same period $\Delta T$ for mutual improvement.

The OCR reading stations 4', which feed OCR datasets 19'$_i$ into the database 11, may, for example, be positioned at particularly "advantageous" first locations A, so as to generate OCR data sets 19'$_i$ of high quality, i.e., with high confidence measures $C_{i,n}$ or $C_i$. Optionally, through an additional check it can be ensured that the OCR data sets 19'$_i$ fed from a first OCR reading station 4' into the database 11 meet in each case minimum requirements for their confidence measures $C_{i,n}$ or $ØC_i$, i.e., an OCR data set 19' is stored in the database 11 only if all its confidence measures $C_{i,n}$ or at least its global confidence measure $ØC_i$ exceed a third minimum confidence value $C_{min,3}$.

It is understood that the database 11 does not necessarily have to be centralized for the entire road network 1. For example, it can also be kept locally in an OCR reading station 4—thus only for a portion of the road network 1—e.g., directly at the location $A_i$ in the computing unit 8 of a first OCR reading station 4', and the latter can make the content of its database 11 directly available, for queries, to another OCR reading station 4" which needs to improve its license plate number reading result, or can transmit the content of its data base to said other OCR reading station.

CONCLUSION

Accordingly, the invention is not limited to the illustrated embodiments, but comprises all variants and modifications which fall within the context of the attached claims.

What is claimed is:

1. A method for reading license plate numbers by means of optical character recognition (OCR) in a road network, comprising:
   in a first OCR reading process, recording a first image of a license plate number at a first location in the road network, OCR-reading a first license plate character string in the first image recording, and storing a first OCR data set including the first license plate number image recording, the first license plate number character string and at least one first confidence measure of the first OCR reading process, as a stored OCR data set in a database;

in a second OCR reading process, recording a second image of a license plate number at a second location in the road network, OCR-reading a second license plate number character string in the second image recording, and generating a second OCR data set including the second license plate number image recording, the second license plate number character string and at least one second confidence measure of the second OCR reading process, as a current OCR data set;

and, if at least one confidence measure of the current OCR data set falls below a first minimum confidence value, selecting at least one stored OCR data set from the database, the license plate number image recording of which selected stored OCR data set has a similarity that exceeds a minimum similarity value and/or has the greatest respective similarity to the license plate number image recording of the current OCR data set, and using the at least one selected OCR data set for improving the license plate number character string of the current OCR data set.

2. The method according to claim 1, wherein based on a plurality of different first locations, a plurality of different first OCR data sets are stored in the database.

3. The method according to claim 2, wherein the first locations comprise some or all intersections of the road network within a closed geographical region.

4. The method according to claim 3, wherein the geographical region is a city or a country.

5. The method according to claim 2, wherein the database is kept in a control center of the road network, and the first OCR data sets to be stored are transmitted from the first locations to the control center, and the current OCR data set is transmitted from the second location to the control center for said selecting.

6. The method according to claim 2, wherein the database is kept locally at one of the first locations, and the current OCR data set is transmitted from the second location to a nearest first location for said selecting.

7. The method according to claim 1, wherein the license plate number character string of the current OCR data set is used for tolling a location usage of a vehicle in the road network.

8. The method according to claim 1, wherein said improving includes superposing the license plate number image recording(s) of the at least one selected stored OCR data set and the license plate number image recording of the current OCR data set, and by OCR-reading again the license plate number character string of the current OCR data set in the superposition.

9. The method according to claim 1, wherein said improving includes taking over the license plate number character string of the selected stored OCR data set into the current OCR data set if at least one confidence measure of the selected stored OCR data set exceeds a second minimum confidence value and/or is greater than the corresponding confidence measure of the current OCR data set.

10. The method according to claim 1, wherein the first OCR data set is stored as stored OCR data set in the database only if the at least one confidence measure of the first OCR data set exceeds a third minimum confidence value.

11. The method according to claim 1, wherein during one or more of the first and second OCR reading processes, a separate confidence measure is generated for each individual character of the character string.

12. The method according to claim 11, wherein another confidence measure is averaged from the confidence measures of all characters of the character string.

13. The method according to claim 1, wherein each stored OCR data set and the current OCR data set also contain in each case the location of their license plate number image recording, and that during said selecting only those stored OCR data sets are considered, the locations of which lie in a predetermined region around the location of the current OCR data set.

14. The method according to claim 1, wherein each stored OCR data set and the current OCR data set also contain in each case the time of their license plate number image recording, and that during said selecting only those stored OCR data sets are considered, the times of which lie within a predetermined period around the time of the current OCR data set.

15. The method according to claim 1, wherein the first OCR data set is stored as stored OCR data set in the database only for a predetermined period.

16. The method according to claim 1, wherein recording an image at at least one first or second location is carried out from a moving control vehicle.

* * * * *